United States Patent
Finnegan et al.

(10) Patent No.: US 8,402,118 B2
(45) Date of Patent: *Mar. 19, 2013

(54) INTELLIGENT LUN GENERATION AND MANAGEMENT

(75) Inventors: Michael Gerard Finnegan, Portland, OR (US); Mark Sean Fleming, Oro Valley, AZ (US); Jin Yan Huang, Shanghai (CN); Michael Allan Nelsen, Longmont, CO (US); Wei Yin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 401 days.

This patent is subject to a terminal disclaimer.

(21) Appl. No.: 12/757,876

(22) Filed: Apr. 9, 2010

(65) Prior Publication Data

US 2011/0252280 A1  Oct. 13, 2011

(51) Int. Cl.
*G06F 15/177* (2006.01)
(52) U.S. Cl. ........................................ 709/220
(58) Field of Classification Search .............. 714/42; 709/220–222
See application file for complete search history.

(56) References Cited

U.S. PATENT DOCUMENTS

| | | | | |
|---|---|---|---|---|
| 5,794,244 A * | 8/1998 | Brosch et al. | ........................ | 1/1 |
| 6,343,324 B1 * | 1/2002 | Hubis et al. | .................... | 709/229 |
| 6,507,896 B2 * | 1/2003 | Sanada et al. | .................. | 711/152 |
| 6,775,230 B1 * | 8/2004 | Watanabe et al. | .............. | 370/228 |
| 7,134,040 B2 * | 11/2006 | Ayres | ............................... | 714/4.3 |
| 7,194,538 B1 * | 3/2007 | Rabe et al. | ...................... | 709/224 |
| 8,161,079 B2 * | 4/2012 | Chen et al. | ...................... | 707/802 |
| 2003/0149753 A1 * | 8/2003 | Lamb | ............................. | 709/223 |
| 2003/0154271 A1 * | 8/2003 | Baldwin et al. | ............... | 709/223 |
| 2003/0188218 A1 * | 10/2003 | Lubbers et al. | .................... | 714/5 |
| 2003/0225950 A1 * | 12/2003 | Paul | ................................. | 710/38 |
| 2007/0214311 A1 | 9/2007 | Burchfield et al. | | |
| 2007/0288693 A1 * | 12/2007 | Rajan et al. | ..................... | 711/114 |

OTHER PUBLICATIONS

Media Robot Utility, Version 1.8A, Guide to Installation, Connectivity, and Operation, Tenth Edition (Oct. 2005), Hewlett-Packard Development Company, L.P., 1. http://h71000.www7.hp.com/doc/robot18a_iguide.pdf.
SCSI, RAID—Small Computer System Interface, University of California Irvine, http://www.nacs.uci.edu/dcslib/digital_unix/digital-v40g/MAN/MAN7/0003_.HTM, last accessed Dec. 22, 2009.

* cited by examiner

*Primary Examiner* — Krisna Lim
(74) *Attorney, Agent, or Firm* — Nelson and Nelson; Daniel P. Nelson; Alexis V. Nelson

(57) ABSTRACT

An apparatus for generating and managing logical units (LUNs) in a storage network environment is disclosed herein. In one embodiment, such an apparatus includes an identification module to identify a type of LUN, one or more servers that will access the LUN, and a storage system that will host the LUN. A mapping module maps the type, the one or more servers, and the storage system to one more abbreviations. A naming module then generates a LUN name that encapsulates the abbreviations. An assignment module may then assign the LUN name to the LUN. A corresponding method and computer program product are also disclosed herein.

12 Claims, 5 Drawing Sheets

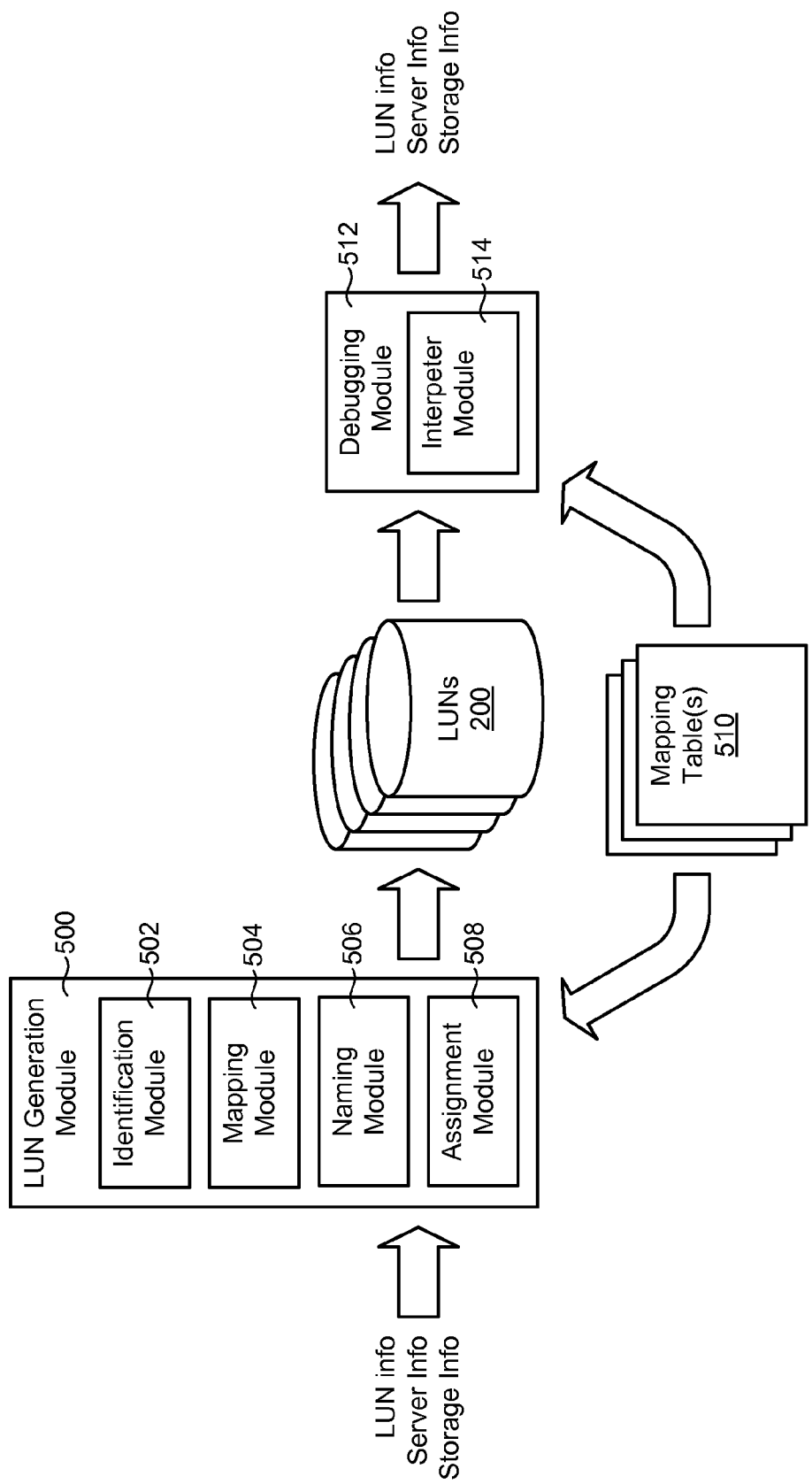

INTELLIGENT LUN GENERATION AND MANAGEMENT

BACKGROUND

1. Field of the Invention

This invention relates to apparatus and methods for intelligently generating and managing logical units (LUNs) in a storage network environment.

2. Background of the Invention

Storage networks, such as storage-area-networks (SANs), are network architectures used to connect servers (also referred to herein as "host systems") to storage systems such as disk arrays, tape libraries, and the like. These storage networks are often heterogeneous, meaning that the host systems and storage systems in the network may be manufactured by different vendors and/or use different operating systems or applications. Each host system in the storage network may be configured to access one or more logical units (LUNs) residing on one or more storage systems. As the number of host systems and/or storage systems in the storage network increases, the number of LUNs in the storage network can increase dramatically. This can make generating and managing LUNs in the storage network a time-consuming, complex, confusing, and error-prone process.

For example, consider a heterogeneous storage network test environment that includes one hundred host systems and ten storage systems. To ensure that each host system is interoperable with each storage system in the network, I/O may be performed between each host system and storage system. This may require creating one or more LUNs for each host system and storage system pair. To implement the above-described scenario where there are one hundred host systems and ten storage systems, at least one thousand (10×100) LUNs may be needed to test the interoperability of each host system with each storage system. Creating and managing this large number of LUNs can be a laborious, error-prone process.

Furthermore, if a problem or error occurs between a specific host system and storage system, the large number of LUNs (each of which may have an arbitrary name) can make tracing and debugging the problem a laborious and time-consuming process. For example, tracing and debugging the problem can involve gathering technical information associated with a LUN name listed in a system log, trace, or GUI. This can involve sifting through tables, examining storage-manager GUI references, and conducting other research to determine technical information about the LUN. Such technical information may include, for example, what server is using the LUN, which storage system is hosting the LUN, what the LUN is used for, whether the LUN is real or virtual, and so forth. Gathering the technical information can make the debug process a time-consuming and laborious process.

In view of the foregoing, what are needed are apparatus and methods to more efficiently generate and manage logical units (LUNs) in a storage network environment. Further needed are apparatus and methods to more efficiently debug problems or errors that occur between a host system and storage system in a storage network environment. Yet further needed are apparatus and methods to more efficiently gather technical information about LUNs in a storage network environment. Such apparatus and methods would be useful in both test and production environments.

SUMMARY

The invention has been developed in response to the present state of the art and, in particular, in response to the problems and needs in the art that have not yet been fully solved by currently available apparatus and methods. Accordingly, the invention has been developed to provide apparatus and methods to generate and manage logical units (LUNs) in a storage network environment. The features and advantages of the invention will become more fully apparent from the following description and appended claims, or may be learned by practice of the invention as set forth hereinafter.

Consistent with the foregoing, an apparatus for generating and managing logical units (LUNs) in a storage network environment is disclosed herein. In one embodiment, such an apparatus includes an identification module to identify a type of LUN, one or more servers that will access the LUN, and a storage system that will host the LUN. A mapping module maps the type, the one or more servers, and the storage system to one or more abbreviations. A naming module then generates a LUN name that encapsulates the abbreviations. An assignment module may then assign the LUN name to the LUN.

In another embodiment of the invention, a computer program product to generate and manage logical units (LUNs) in a storage network environment is disclosed herein. Such a computer program product includes a computer-usable storage medium having computer-usable program code embodied therein. In one embodiment, the computer-usable program code includes program code to determine (automatically or with user input) a type of LUN, program code to identify one or more servers that will access the LUN, and program code to identify a storage system that will host the LUN. The computer-usable program code further includes program code to generate a LUN name that encapsulates the type, the one or more servers, and the storage system. Additional computer-usable program code then assigns the LUN name to the LUN.

A corresponding method is also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 5 is a high-level block diagram showing various modules that may be used to generate LUNs and embed technical information in LUN names, as well as extract technical information from LUN names for debugging purposes.

DETAILED DESCRIPTION

Figure 1:
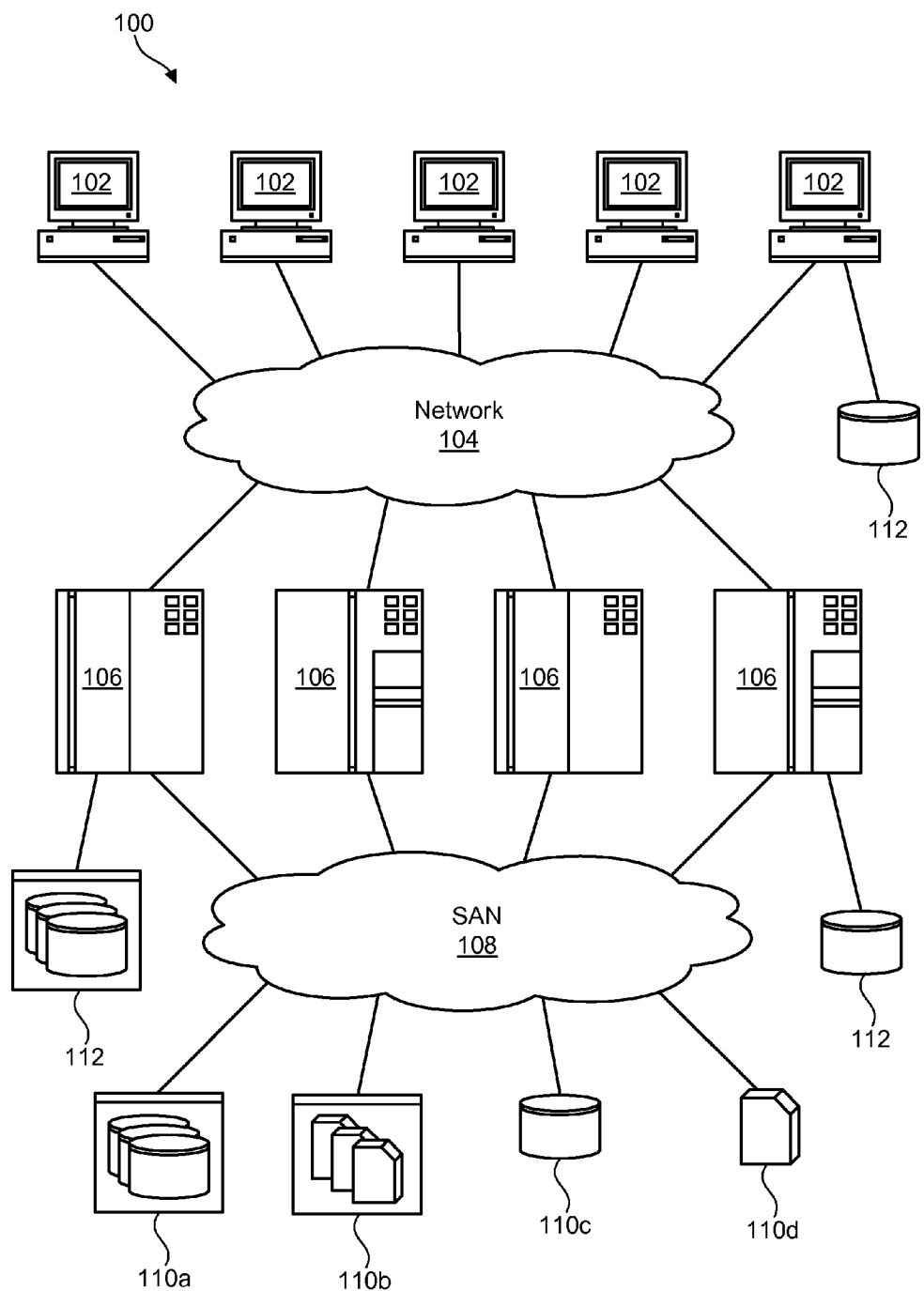
FIG. 1 is a high-level block diagram of one example of a network architecture where an apparatus, method, and computer program product in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show an example of an environment where an apparatus, method, and computer program product in accordance with the invention may be implemented. The network architecture 100 is presented only by way of example and is not intended to be limiting. Indeed, the apparatus, methods, and computer program products disclosed herein may be applicable to a wide variety of different network architectures in addition to the illustrated network architecture 100.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems 106"). In general, client computers 102 may initiate communication sessions, whereas server computers 106 may wait for requests from the client computers 102. In certain embodiments, the computers 102 and/or servers 106 may connect to one or more internal or external direct-attached storage systems 112 such as arrays of hard disk drives or solid-state drives, tape libraries, tape drives, or the like. The computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. Where the network 108 is a SAN, the servers 106 and storage systems 110 may communicate using a networking standard such as Fibre Channel (FC).

Figure 2:
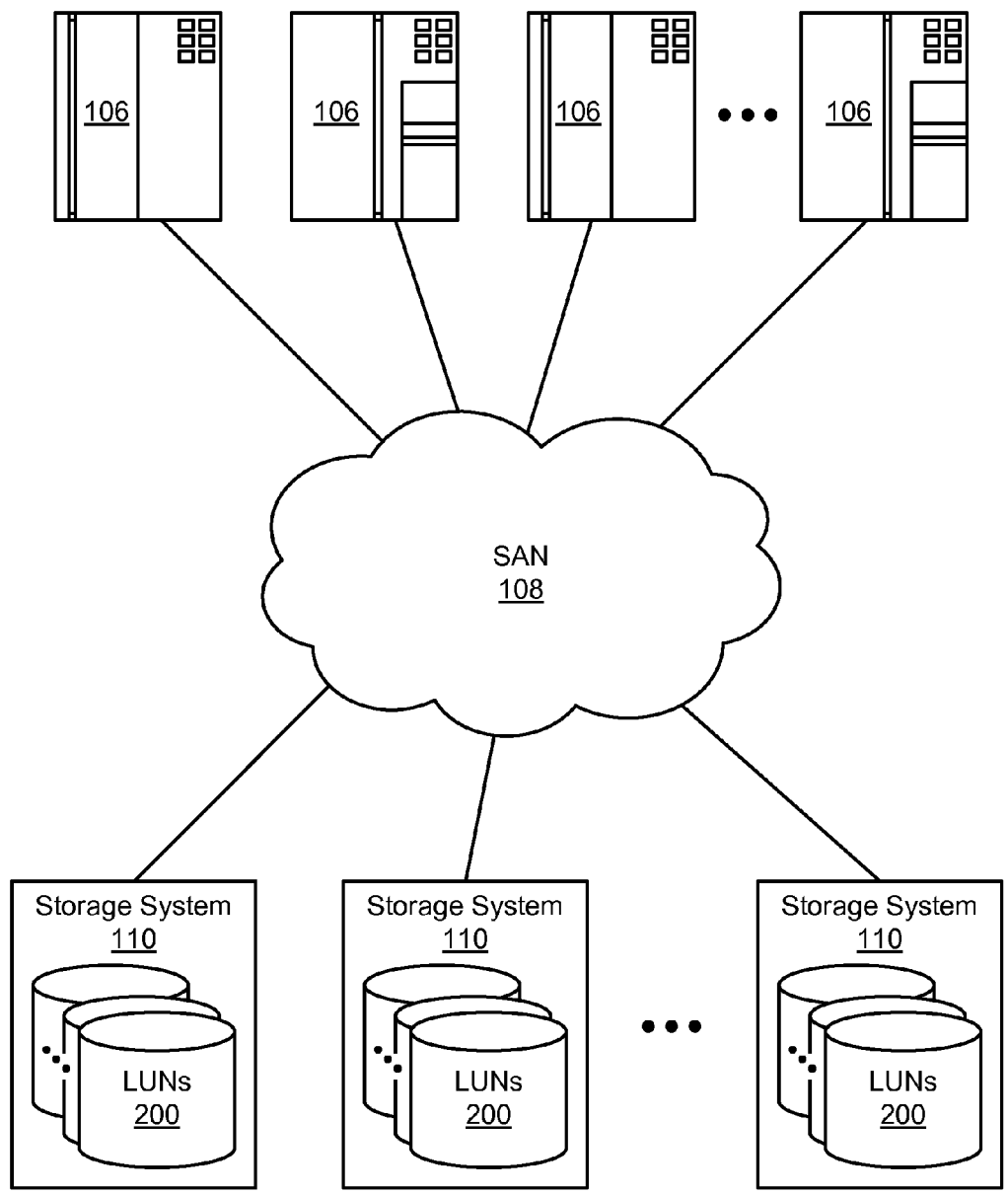
FIG. 2 is a high-level block diagram showing various logical units (LUNs) that may be generated in a storage network environment.

Referring to FIG. 2, as previously mentioned, storage networks 108, such as storage-area-networks (SANs) 108, are network architectures used to connect servers 106 to storage systems 110 such as disk arrays, tape libraries, and the like. These storage networks 108 are often heterogeneous, meaning that the host systems 106 and storage systems 110 connected to the network 108 may be manufactured by different vendors and/or use different operating systems or applications Each host system 106 in the storage network 108 may be configured to access one or more logical units (LUNs) 200 residing on one or more storage systems 110. As the number of host systems 106 and/or storage systems 110 in the storage network 108 increases, the number of LUNs 200 in the storage network 108 can increase to a point where they are very difficult to track and manage. Generating and managing these LUNs 200 in the storage network 108 can be time-consuming, complex, confusing, and error-prone.

For example, consider a heterogeneous storage network 108 used for testing purposes that includes one hundred host systems 106 and ten storage systems 110. To ensure that each host system 106 will operate correctly with each storage system 110 in the network 108, each host system 106 may perform I/O on each storage system 110 in the storage network 108. This may require creating one or more LUNs 200 for each host system 106 and storage system 110 pair. To implement the above-described scenario, at least one thousand (10×100) LUNs 200 may be needed to test the interoperability of each host system 106 with each storage system 110. Creating and managing such a large number of LUNs 200 can be a laborious and error-prone process.

If a problem or error occurs between a specific host system 106 and storage system 110, the large number of LUNs 200 can make tracing and debugging the problem laborious and time-consuming. For example, tracing and debugging the problem can involve gathering technical information associated with a LUN name listed in a system log, trace, or GUI. This can involve sifting through tables, examining storage-manager GUI references, and conducting other research to determine technical information about the LUN 200. Such technical information may include, for example, what server 106 is using the LUN 200, which storage system 110 is hosting the LUN 200, what the LUN 200 is used for, whether the LUN 200 is real or virtual, and so forth. Gathering such technical information can make the debug process time-consuming and laborious.

Figure 3:
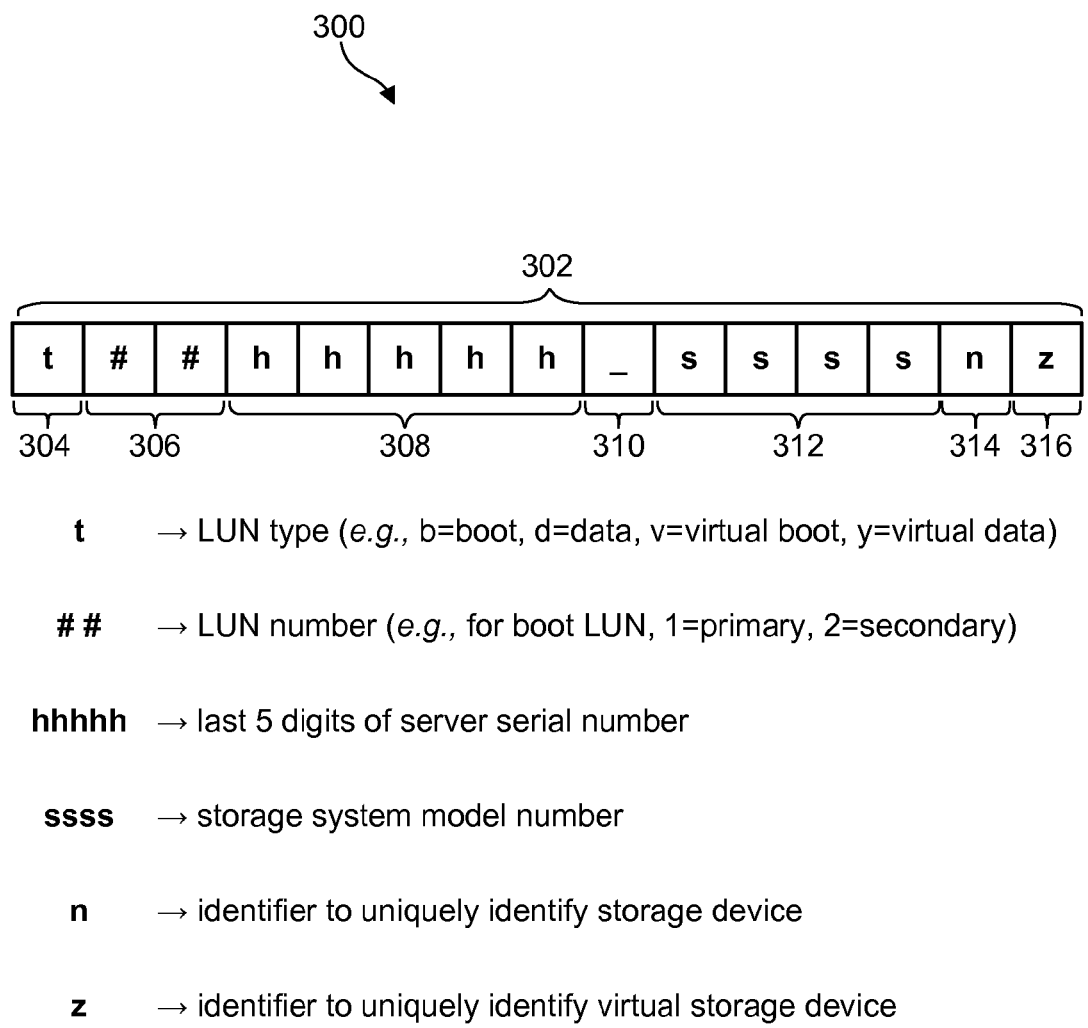
FIG. 3 is a diagram showing an example of a naming format for embedding technical information in a LUN name.

Referring to FIG. 3, in order to address the above-stated problems, a naming format 300 in accordance with the invention may be used to embed technical information in the names of storage network LUNs 200. In certain embodiments, this naming format 300 may enable descriptive LUN names to be automatically generated for LUNs 200 in a storage network environment 108. The naming format 300 may improve organization and thereby help to improve efficiency when managing a storage network 108. The naming format 300 may also accelerate debugging of storage network problems and errors by allowing technical information about the configuration and environment to be determined by reading and interpreting a LUN name. This, in turn, may reduce or eliminate time sifting through tables, examining storage-manager GUI references, and conducting research to determine technical information associated with a LUN 200.

As shown in FIG. 3, certain types of technical information may be embedded in a LUN name 302. This technical information may include, for example, which server 106 is using the LUN 200, which storage system 110 is hosting the LUN 200, what the LUN 200 is used for, whether the LUN 200 is real or virtual, among other information. The length of the name 302 may be constrained by character-count limitations. In the illustrated example, the LUN name 302 is limited to fifteen characters, although other numbers of characters are possible and within the scope of the invention. In order to fit certain types of technical information into the LUN name 302, the technical information may be abbreviated (i.e., compressed) to fit within a specified number of characters. As will be explained in more detail hereafter, in certain embodiments, these abbreviations may be stored in one or more mapping tables.

As shown in FIG. 3, a first character 304 of the LUN name 302 may be used to describe a LUN type. For example, this character 304 may be used to describe whether a LUN 200 is real or virtual, or is a boot or data LUN 200. In certain embodiments, the character 'b' may be used to indicate that the LUN 200 is a real boot LUN 200 (a real LUN 200 storing boot data such as an operating system to boot one or more host systems 106); the character 'd' may indicate that a LUN 200 is a data LUN 200 (a real LUN 200 that stores application data); the character 'v' may indicate that a LUN 200 is a virtual boot LUN 200 (a virtual LUN 200 storing boot data such as an operating system); and the character 'y' may indicate that a LUN 200 is a virtual data LUN 200 (a virtual LUN 200 storing application data). Other types of LUNs 200 are also possible and within the scope of the invention.

The next group of characters 306 in the LUN name 302 may store a LUN number. For example, if there are two boot LUNs 200 residing on a storage system 110, the first boot LUN 200 may be assigned a '1' and the second boot LUN 200 may be assigned a '2.' Two characters 306 may be reserved for this purpose since there may be many LUNs 200 of the same type on a storage system 110 and more than one character may be needed to describe them all. Nevertheless, the number of characters 306 allocated for this purpose may be adjusted as needed.

The next group of characters 308 in the LUN name 302 may store a server serial number, a portion of a server serial number, or other identifier associated with the server 106 that is using the LUN 200. In other embodiments, if more than one server 106 is accessing the LUN 200 (such as if multiple servers 106 boot from the same LUN 200), a more general description, such as a server model number or an operating system used by the servers 106 may be stored instead of the server serial number. In general, the characters 308 may identify the server 106 or group of servers 106 using the LUN 200. Although five characters 308 are allocated for this purpose in the illustrated embodiment, the number of characters 306 allocated may be adjusted as needed or a new mapping definition may be created.

The next group of characters 312 in the LUN name 302 (not counting the underscore character 310) may store a model number or other storage identifier for the storage system 110 that is hosting the LUN 200. In the illustrated embodiment, four characters are allocated for this purpose. If the actual model number exceeds four characters, the model number may be abbreviated to four characters such as by using the first or last four characters of the model number. If the LUN 200 is a virtual LUN 200 that resides on a virtual storage system 110, such as an IBM SAN Volume Controller (SVC) or IBM Virtual I/O Server (VIOS), the characters 312 may store the model number of the physical storage device (an IBM DS8000® disk array, for example) behind the virtual storage system.

The next character 314 may store an identifier to uniquely identify a physical storage system 110 in the event there are multiples of the same model in the storage network 108. For example, if there are multiples of the same model, an 'a' may identify a first storage system, a 'b' may identify a second storage system, a 'c' may identify a third storage system, and so forth. If only a single storage system 110 of a particular model is present in the storage network 108, a default value of 'a' may be stored for the storage system 110.

Similarly, the character 316 may contain an identifier to uniquely identify a virtual storage system in the event there are multiples of the same model in the storage network 108. For example, an 'a' may identify a first virtual storage system, a 'b' may identify a second virtual storage system, and so forth. In selected embodiments, the character 316 is optional and may be omitted if multiple virtual storage systems of the same model do not exist in the storage network 108. In certain embodiments, if only a single virtual storage system of a particular model is present in the storage network 108, a default value of 'a' may be stored for the virtual storage system.

It should be noted that the naming format 300 described in FIG. 3 may be modified in various respects without departing from the principles taught herein. For example, certain characters or groups of characters may be rearranged or the number of characters allocated for different types of technical information may be increased or decreased as needed as long as the overall length of the LUN name 302 does not exceed any character-count limitations. Some characters, such as the underscore character 310, may be eliminated or used to store different types of technical information, as needed. It should also be noted that various characters or groups of characters may be deleted from or added to the naming format 300, as needed.

Figure 4:
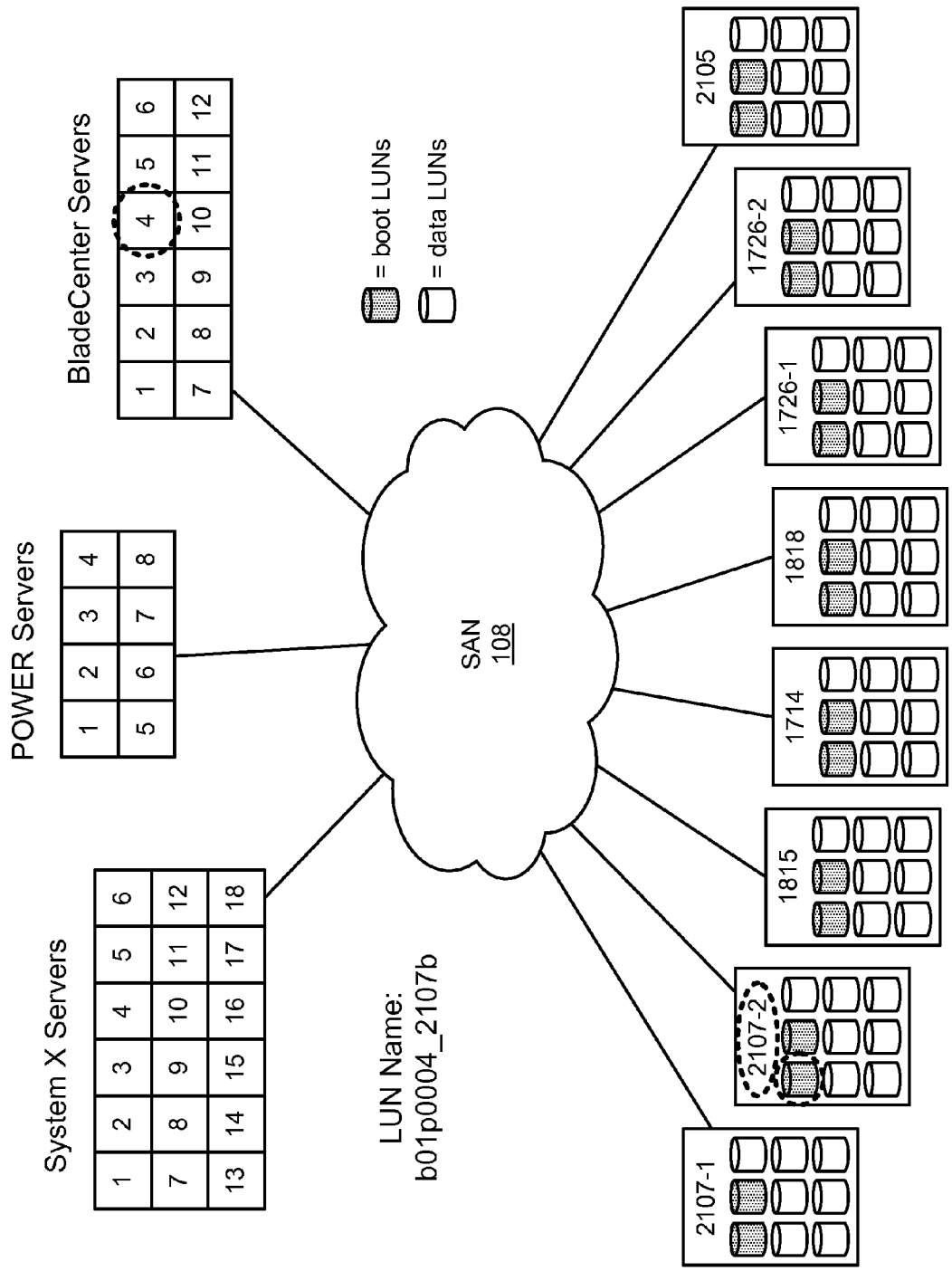
FIG. 4 is a high-level block diagram showing how technical information can be extracted from a LUN name using the format described in FIG. 3.

Referring to FIG. 4, one example of a storage network 108 showing the utility of the naming format 300 described in FIG. 3 is illustrated. Assume that the LUN name "b01p0004_2107b" is extracted from a system log when an error or problem occurs in the storage network 108. By examining the LUN name 302, a system administrator or debugging application can determine the type of LUN 200 that was associated with the problem or error, the LUN number, the server 106 or servers 106 that use the LUN 200, and the storage system 110 that hosts the LUN. In this example, the LUN name 302 indicates that the LUN 200 is the first boot LUN used by the server having serial number "p0004" (in this example the fourth BladeCenter® server). The LUN 200 resides on the second storage system 110 (as indicated by the character "b" at the end of the LUN name) having the model number "2107," which in this example is an IBM DS8000® enterprise storage system 110. All of this technical information may be determined by simply examining the LUN name 302, without needing to sift through tables, examine storage-manager GUI references, or conduct other research to determine desired technical information.

Referring to FIG. 5, one of the benefits of the naming format 300 illustrated in FIG. 3 is that it may be used by various automated tools to generate descriptive LUN names 302 and thereby provide more efficient and dynamic LUN definition and creation. The naming format 300 may also be used by automated tools to accelerate debugging of storage network problems and errors by allowing technical information about the configuration and environment to be determined by reading and interpreting LUN names 302. These automated tools are generically represented in FIG. 5 as one or more modules. These modules may be implemented in hardware, software or firmware executable on hardware, or a combination thereof.

As shown, a LUN generation module 500 is configured to generate LUNs 200 in a storage network environment. The LUN generation module 500 may include one or more of an identification module 502, a mapping module 504, a naming module 506, and an assignment module 508. The identification module 502 is configured to identify or gather technical information about a LUN 200, such as the type of LUN 200, which server 106 is using the LUN 200, which storage system 110 is hosting the LUN 200, what the LUN 200 is used for, whether the LUN 200 is real or virtual, and so forth. Once this technical information is identified, a mapping module 504 maps the information to one or more abbreviations, thereby allowing the information to fit within a specified number of characters. In doing so, the mapping module 504 may reference one or more mapping tables 510 that map the technical information to the abbreviations and vice versa. Once the abbreviations are determined, a naming module 506 generates a name 302 in conformance with the naming format 300 that contains the abbreviations. An assignment module 508 may then assign the name to the generated LUN 200.

When a problem or error occurs in association with one or more LUNs 200 in the storage network 108, a debugging module 512 may debug the problem or error. In certain embodiments, the debugging module 512 is configured to extract LUN names associated with the error or problem from a system log, trace, or GUI. The debugging module 512 may then acquire technical information about the LUN 200 by simply reading and examining the LUN name 302. In selected embodiments, the debugging module 512 includes an interpreter module 514. The interpreter module 514 may translate any abbreviations in the LUN name 302 to technical information that is more usable and/or readable to a human or machine. To accomplish this, the interpreter module 514 may utilize the mapping tables 510 previously discussed.

The modules illustrated in FIG. 5 are presented only by way of example and are not intended to be limiting. Indeed, alternative embodiments may include more or fewer modules than those illustrated. It should also be recognized that, in some embodiments, the functionality of some modules may be broken into multiple modules, or conversely, the functionality of several modules may be combined into a single or fewer modules.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A computer program product to generate and manage logical units (LUNs) in a storage network environment, the computer program product comprising a computer-usable storage medium having computer-usable program code embodied therein, the computer-usable program code comprising:

computer-usable program code to determine a type for a LUN;

computer-usable program code to identify at least one server that will access the LUN;

computer-usable program code to identify a storage system that will host the LUN;

computer-usable program code to generate a LUN name that encapsulates the type, the at least one server, and the storage system;

computer-usable program code to assign the LUN name to the LUN; and computer-usable program code to debug a problem associated with the LUN by determining, from the LUN name, at least one of the type, the at least one server, and the storage system associated with the LUN.

2. The computer program product of claim 1, wherein determining a type comprises determining the LUN is at least one of a real boot LUN, a real data LUN, a virtual boot LUN, and a virtual data LUN.

3. The computer program product of claim 1, wherein identifying at least one server comprises identifying a server serial number associated with the at least one server.

4. The computer program product of claim 1, wherein identifying a storage system comprises identifying a storage model number associated with the storage system.

5. The computer program product of claim 1, wherein generating a LUN name comprises storing abbreviations for at least one of the type, the at least one server, and the storage system in the LUN name.

6. The computer program product of claim 5, further comprising computer-usable program code to map at least one of the type, the at least one server, and the storage system to the abbreviations.

7. The computer program product of claim 1, further comprising computer-usable program code to establish an identifier for the LUN and encapsulate the identifier in the LUN name.

8. An apparatus for generating and managing logical units (LUNs) in a storage network environment, the apparatus comprising:
    a plurality of modules implemented in at least one of hardware and computer-implemented software, the modules comprising:
        an identification module to identify a type of LUN, at least one server that will access the LUN, and a storage system that will host the LUN;
        a mapping module to map the type, the at least one server, and the storage system to one more abbreviations;
        a naming module to generate a LUN name that encapsulates the abbreviations;
        an assignment module to assign the LUN name to the LUN; and
        a debugging module to debug a problem associated with the LUN by determining, from the LUN name, at least one of the type, the at least one server, and the storage system associated with the LUN.

9. The apparatus of claim 8, wherein the type is selected from the group consisting of a real boot LUN, a real data LUN, a virtual boot LUN, and a virtual data LUN.

10. The apparatus of claim 8, wherein the identification module identifies the at least one server using at least one server serial number.

11. The apparatus of claim 8, wherein the identification module identifies the storage system by storage model number.

12. The apparatus of claim 8, wherein the mapping module references at least one mapping table to map the type, the at least one server, and the storage system to one more abbreviations.

* * * * *